United States Patent [19]
Takeda et al.

[11] Patent Number: 5,694,550
[45] Date of Patent: Dec. 2, 1997

[54] AUTOMATIC SWITCHING METHOD OF A RIGHT OF MANAGEMENT/CONTROL FOR SHARED-STORAGE UNIT

[75] Inventors: Hirofumi Takeda; Takashi Kurihara, both of Yokohama, Japan

[73] Assignee: Fujitsu Limited, Tokyo, Japan

[21] Appl. No.: 749,884

[22] Filed: Nov. 15, 1996

Related U.S. Application Data

[63] Continuation of Ser. No. 121,644, Sep. 16, 1993, abandoned.

[30] Foreign Application Priority Data

Sep. 17, 1992 [JP] Japan .................. 4-246971

[51] Int. Cl.⁶ .................. G06F 13/14; G06F 11/30; G06F 15/16
[52] U.S. Cl. .................. 395/200.11; 395/200.05; 395/200.12; 395/182.11; 395/184.01; 364/269.3; 364/268.8; 364/944.3; 364/DIG. 1; 364/DIG. 2
[58] Field of Search .................. 395/200.02, 200.04, 395/200.05, 200.11, 200.12, 200.19, 290, 311, 439, 182.02, 182.09, 182.11, 184.01; 371/47.1; 364/DIG. 1, DIG. 2, 146, 269, 269.3, 945, 945.2, 268, 268.3, 268.8, 944.3

[56] References Cited

U.S. PATENT DOCUMENTS

| | | | |
|---|---|---|---|
| Re. 33,521 | 1/1991 | Mori et al. | 364/200 |
| 4,253,146 | 2/1981 | Bellamy et al. | 364/200 |
| 4,455,601 | 6/1984 | Griscom et al. | 364/268 |
| 5,056,007 | 10/1991 | Collins, Jr. et al. | |
| 5,155,729 | 10/1992 | Rysko et al. | 395/182.09 |
| 5,339,408 | 8/1994 | Buckert et al. | 395/575 |
| 5,384,783 | 1/1995 | Satomi et al. | 371/9.1 |
| 5,418,955 | 5/1995 | Ikeda et al. | |
| 5,513,341 | 4/1996 | Fujii et al. | 364/268.3 |

Primary Examiner—Larry D. Donaghue
Assistant Examiner—Mark H. Rinehart
Attorney, Agent, or Firm—Staas & Halsey

[57] ABSTRACT

An automatic method for switching a right of management/control for a shared-storage unit between a plurality of service processors in a cluster-coupled system having a shared-storage unit with a service processor selecting register and a plurality of clusters connected to the shared-storage unit, each clusters having a service processor, includes the steps of: registering a physical number of the service processor which acquires the right of management/control in the service processor selecting register; and providing a communication line connecting all service processor; wherein when a first cluster detects power-off or hang-up message from the cluster which includes the service processor registered in the service processor selecting register through the communication line, the first cluster determines a new physical number of the service processor which acquires the right of management/control based on a predetermined decision theory, and registers the determined physical number in the service processor selecting register.

8 Claims, 4 Drawing Sheets

AUTOMATIC SWITCHING METHOD OF A RIGHT OF MANAGEMENT/CONTROL FOR SHARED-STORAGE UNIT

This application is a continuation of application Ser. No. 08/121,644, filed Sep. 16, 1993, now abandoned.

BACKGROUND OF THE INVENTION

1. Field of the Invention

The present invention relates to an automatic switching method of a right of management/control for a shared-storage unit from a service processor in a cluster coupled system, for example, so-called a SCMP (storage-coupled multiprocessor) system. As explained below, a right of management/control is defined as a right for managing and controlling a shared-storage unit from a service processor.

2. Description of the Related Art

There is a well-known cluster-coupled system which is formed of a plurality of clusters and one shared-storage unit (SSU) connected to all of the clusters each of which includes a service processor (SVP). In general, a cluster-coupled system is very effective as a data processing system which requires high speed and high reliability.

Since a cluster-coupled system employs one shared-storage unit, it is possible to realize high-speed memory access and high-speed data transfer in comparison with a system which has a file storage unit such as a DASD (direct access storage device). Further, in general, since each cluster includes a current/standby feature, it is possible to provide a high-reliability system by switching between the "current" and the "standby" modes. Still further, each cluster can acquire a right of management/control for the shared-storage unit to control the same.

However, in a conventional cluster-coupled system, only the one cluster which acquires the right of management/control is connected to the shared-storage unit. Accordingly, if the power source of the cluster acquiring the right is turned off or if the cluster enters a hang-up state, no other cluster in the cluster coupled system can manage and control the shared-storage unit after such troubles occur. As a result, the system fails. Accordingly, it is necessary to provide an effective method which can automatically switch control from the faulty service processor (i.e., the service processor currently acquiring the right) to another service processor (i.e., the service processor which requires the right).

SUMMARY OF THE INVENTION

The object of the present invention is to provide an automatic switching method which can automatically switch from the faulty service processor (i.e., the service processor currently acquiring the right) to another service processor (i.e., the service processor which requires the right).

In accordance with the present invention, there is provided an automatic switching method of a right of management/control for a shared-storage unit from a service processor in a cluster-coupled system which is formed of one shared-storage unit and a plurality of clusters connected to the shared-storage unit, each of clusters including a service processor, and the shared-storage unit including a service processor selecting register, including the steps of:
registering the physical number of the service processor which acquires the right of management/control in the service processor selecting register; and providing a communication line connecting all service processors;
wherein, when another cluster detects power-off or hang-up of the cluster which includes the service processor registered in the service processor selecting register through the communication line, another cluster determines a new physical number of the service processor which acquires the right of management/control based on a predetermined decision theory, and registers the determined physical number in the service processor selecting register.

In one embodiment, the cluster-coupled system is a SCMP (storage-coupled multiprocessor) system.

In another embodiment, the predetermined decision theory is defined by the smallest physical number of the service processor.

In still another embodiment, the communication line is a local area network.

In still another embodiment, the service processor which acquires the right of management/control is defined as a level-one service processor.

DESCRIPTION OF THE PREFERRED EMBODIMENTS

Before describing the preferred embodiments, a conventional art and its problem will be explained in detail with respect to the drawings.

Figure 1:
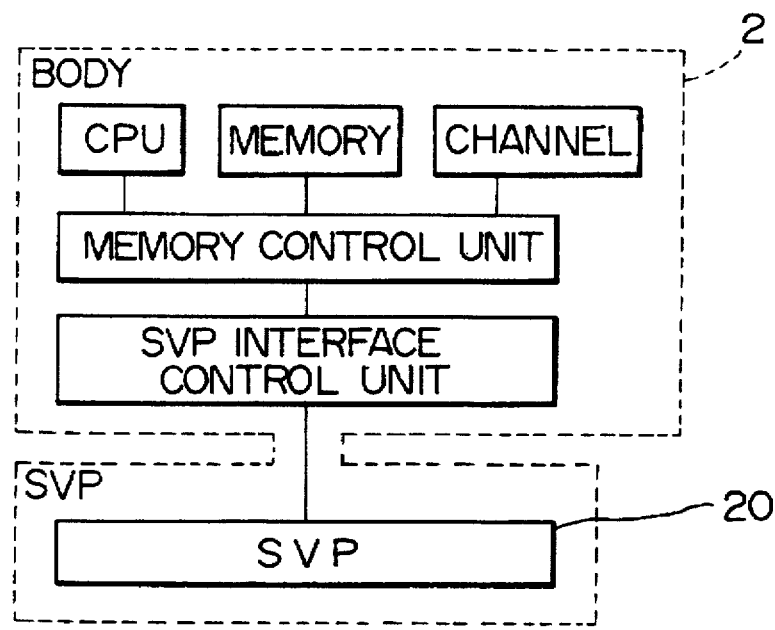
FIG. 1 is a diagram of a known cluster structure.
Figure 2:
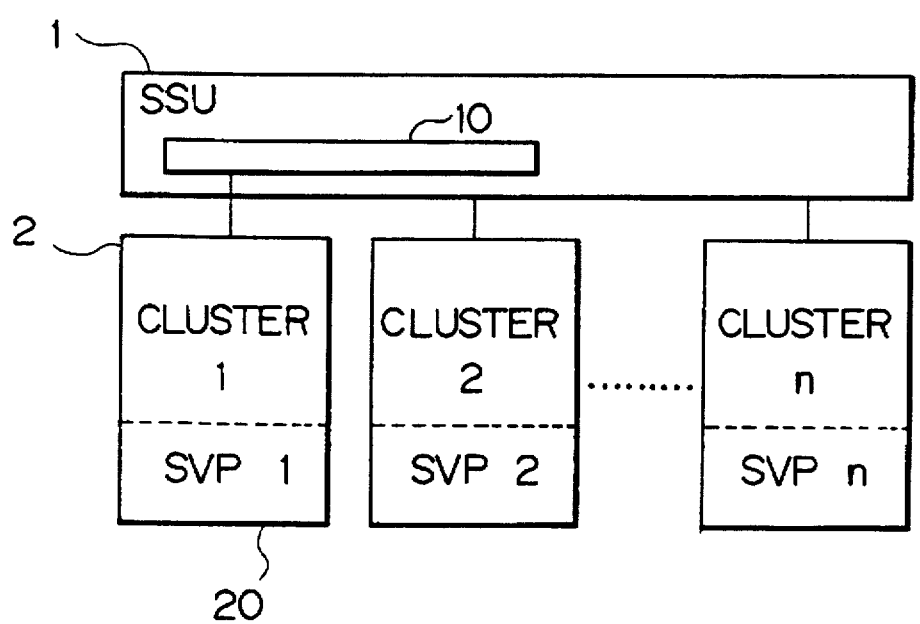
FIG. 2 is a diagram of a known cluster-coupled system.

FIG. 1 shows one example of a cluster structure, and FIG. 2 shows one example of a cluster-coupled system in a conventional art.

In FIG. 1, a computer system 2 (below, "cluster") includes a service processor (SVP) 20. A main unit of the cluster 2 is formed of a central processing unit CPU, a memory, a channel, a memory control unit, and an SVP interface control unit. The service processor 20 is connected to the SVP interface control unit.

In FIG. 2, the cluster-coupled system is formed of one shared-storage unit (SSU) 1 and a plurality of clusters, each including a service processor 20. Such a cluster-coupled system is called a SCMP (storage-coupled multiprocessor) system. Further, the shared-storage unit 1 includes a SVP interface control unit 10.

As shown in FIG. 2, in a conventional SCMP system, only one service processor (SVP) 20 is physically connected to the SVP interface control unit 10, and only such service processor acquires a right of management/control for the shared-storage unit (SSU) 1. Accordingly, the cluster 2 having such service processor 20 (i.e., cluster 1) is defined as the service processor at level-one.

The right of management/control includes, for example, a right of connection control between the shared-storage unit and another cluster, a right for initializing the shared-storage unit, a right for allocating an address to memories which are provided in the shared-storage unit, etc.

Accordingly, if a right of management/control does not act sufficiently from the service processor 20 to the shared-storage unit 1, it is impossible to eliminate the faulty service processor (i.e., faulty cluster) from the system so that the SCMP system fails.

As explained above, in the above conventional art, since only the service processor 20 acquiring the right of management/control is physically connected to the shared-storage unit 1, if the power source of the cluster 1 including such service processor 20 is turned off or the service processor 20 enters a hang-up state, no other service processor can be connected to the SVP interface control unit 10 of the shared-storage unit 1. Accordingly, no other service processor 20 can manage and control the shared-storage memory so that the system fails. That is, when only one service processor (or cluster including such service processor) fails, the whole system enters a "system down" state in the conventional art.

Accordingly, the present invention aims to provide an automatic switching for a service processor having a right of management/control for a shared-storage unit from a service processor in a cluster-coupled system. According to the present invention, it is possible to automatically switch the right of management/control for the shared-storage unit even if the service processor acquiring the right of the management/control enters a hang-up state or the power source of the cluster is turned off.

Figure 3:
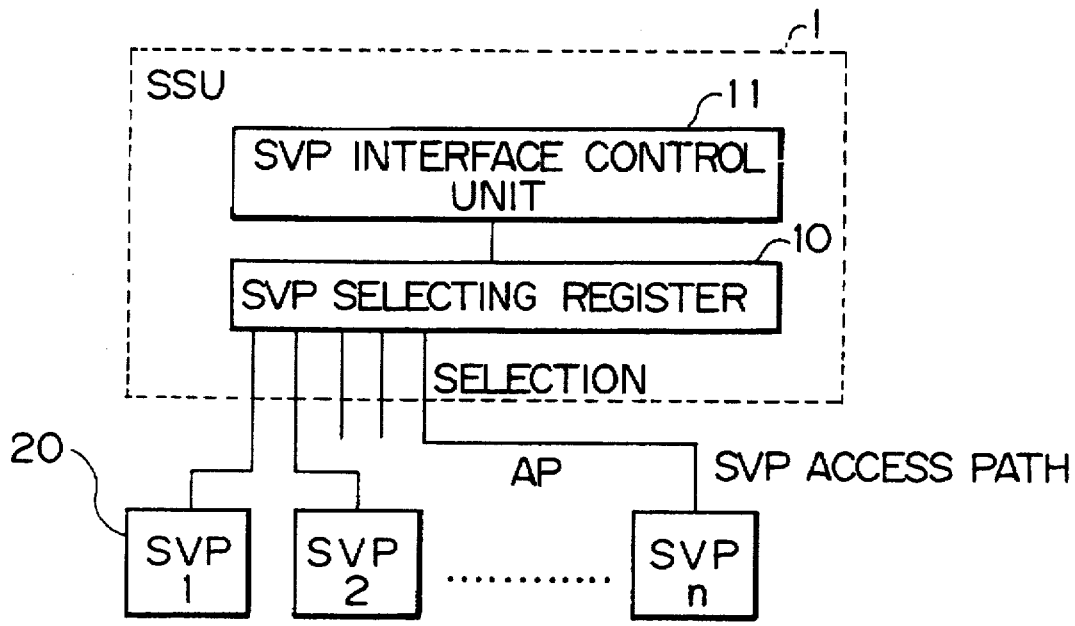
FIG. 3 is a diagram showing a principle structures of a preferred embodiment of the present invention.
Figure 4:
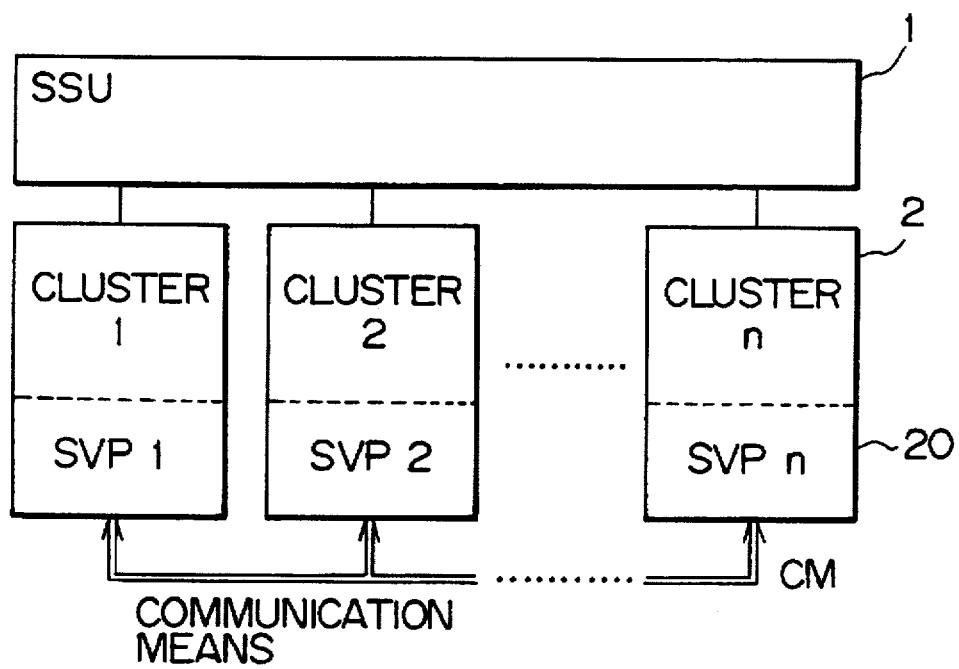
FIG. 4 is a diagram showing a principle structure of a preferred embodiment of the present invention.

FIGS. 3 and 4 show the principle structure of the present invention. In FIG. 3, the shared-storage unit 1 of the present invention includes an SVP interface control unit 11 and an SVP selecting register (SVP-SRG) 10. All service processors SVP1 to SVPn are connected in parallel to the SVP selecting register 10 through access paths AP. The SVP selecting register 10 is provided for selectively storing a physical number (ID) of the service processor which acquires the right of management/control. This service processor which acquires the right of management/control is called level-one (L1) service processor.

In FIG. 4, only one shared-storage unit (SSU) 1 is connected to all clusters 1 to n, and each cluster includes the service processor 20 as explained above. All service processors SVP1 to SVPn are interconnected each other through a communication means CM, preferably, a local area network (LAN).

When any one of the clusters 2, which has the smallest physical number ID compared to the other clusters except for the cluster including the level-one service processor, detects, through the communication means CM, a power-off or a hang-up of the cluster which is registered in the SVP selecting register 10 (i.e., the cluster including the service processor which currently acquires the right of the management/control, i.e., a level-one service processor), the cluster 2 determines its own physical number ID as a service processor 20 which can control the shared-storage unit 1 in accordance with a predetermined decision theory. Further, the physical number of new service processor is set in the SVP selecting register. In the above case, for example, the smallest physical number ID is used as the "predetermined decision theory" as explained below.

Then, the new service processor is determined as the level-one service processor acquiring the right of management/control, and the cluster including the above level-one service processor can manage and control the shared-storage unit 1 without the whole system stopping.

An embodiment of the present invention will be explained in detail with respect to the drawings.

Figure 5:
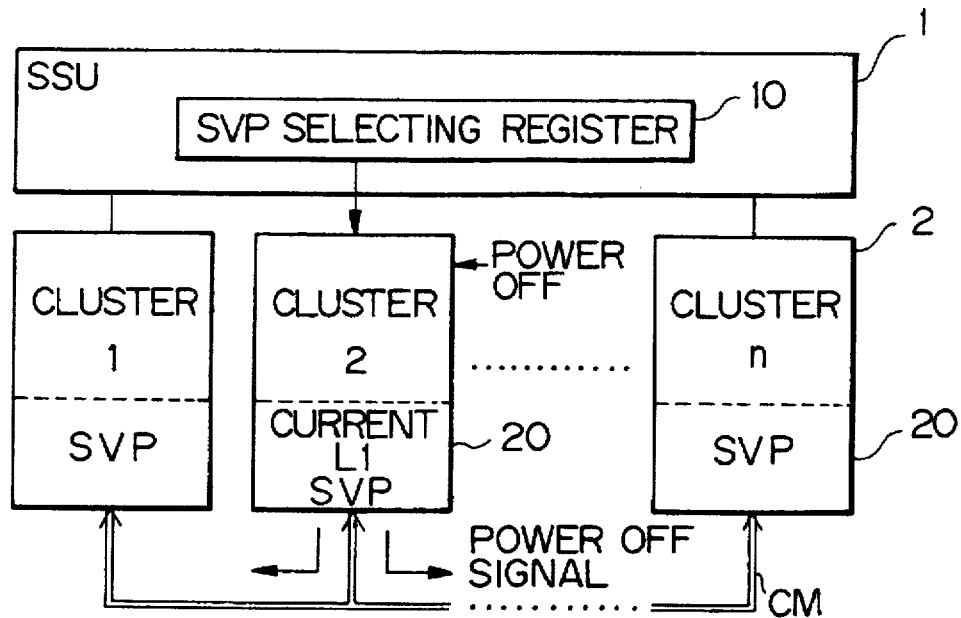
FIG. 5 is a diagram of a power-off state of the service processor in accordance with a preferred embodiment of the present invention.
Figure 6:
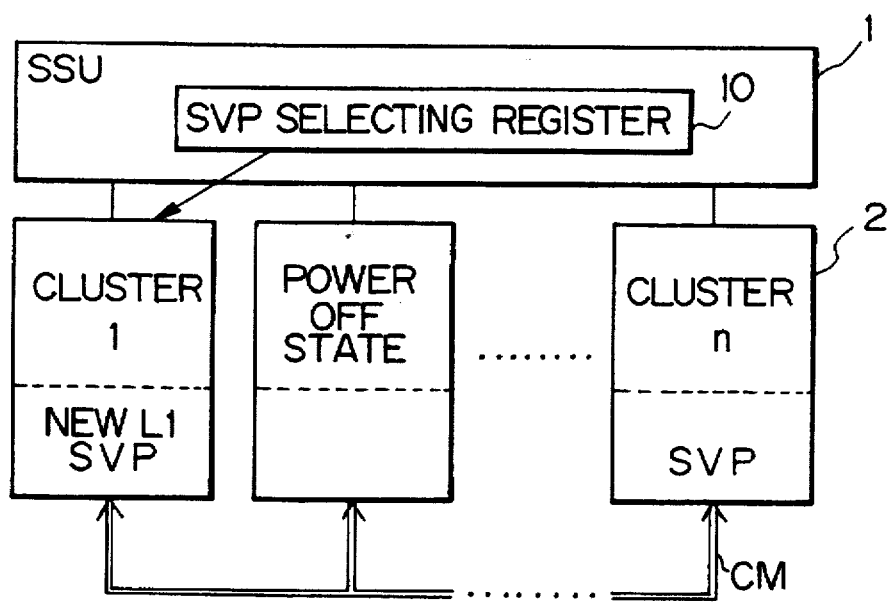
FIG. 6 is a diagram of a power-off state of the service processor in accordance with a preferred embodiment of the present invention.

FIGS. 5 and 6 are explanatory views of a power-off state of the service processor. In these drawings, FIG. 5 shows the detection of a change in the state of the service processor, and FIG. 6 shows a switching method of the level-one service processor using the SVP selecting register 10.

As shown in these drawings, in the shared-storage unit (SSU) 1, the SVP selecting register 10 is provided for selecting the level-one service processor which acquires the right of the management/control for the shared-storage unit 1. This is performed by setting the physical number (ID) of the service processor 20 acquiring the right of the management/control for the shared-storage unit 1.

When the power of the SCMP system is turned on, the SVP selecting register sets a physical number ID of a service processor 20 which is previously determined. On the other hand, the physical number ID of the service processor can be set in the SVP selecting register 10 when the structure of the SCMP is changed. Only the service processor 20 corresponding to the physical number ID which is set in the SVP selecting register 10 can selectively manage and control the shared-storage unit 1 through the SVP interface control unit 11.

As mentioned above, in the present invention, the communication means CM is provided so as to be able to communicate and check each other among the service processors.

In FIG. 5, when the service processor 20 which is registered in the SVP selecting processor 10 recognizes a power-off of its own cluster 2, the service processor 20 informs the power-off of its own cluster through the communication means CM in the present invention.

When any service processor receives a power-off or a hang-up indication of the service processor, which is set in the SVP selecting register 10, such service processor determines whether its own physical number is the smallest based on the decision theory as explained above. When a service processor identifies its own physical number as the smallest, this own service processor is recognized as the level-one service processor. Further, the physical number ID is registered in the SVP selecting register 10. As a result, the physical number ID of the SVP selecting register 10 is updated, and the old level-one service processor is switched to the new service processor, as determined by the above processes.

As explained above, the predetermined decision theory includes, for example, the smallest physical number. That is, according to the decision theory, the next service processor is determined based on judgement as to whether the physical number ID of its own service processor is the smallest of all the service processors.

Figure 7:
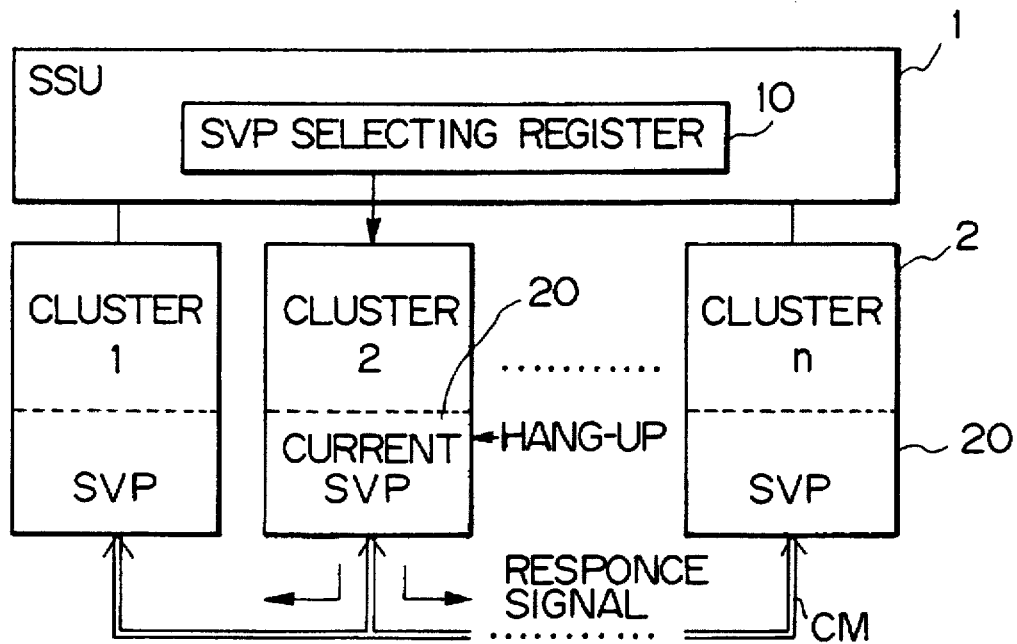
FIG. 7 is a diagram of a hang-up state of the service processor in accordance with a preferred embodiment of the present invention.
Figure 8:
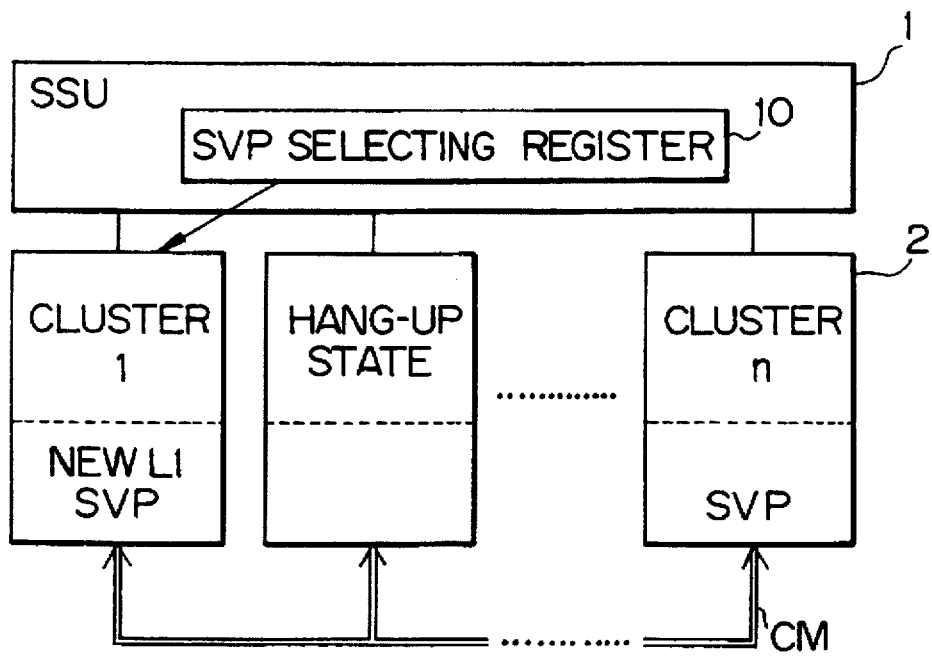
FIG. 8 is a diagram of a hang-up state of the service processor in accordance with a preferred embodiment of the present invention.

FIGS. 7 and 8 are explanatory views of the hang-up state of the service processor. In these drawings, FIG. 7 shows the detection of change in the state of the service processor, and FIG. 8 shows a switching method of the level-one service processor using the SVP selecting register 10.

As mentioned above, in the SCMP system, the service processor 20 always checks the state of other service processors. For example, the service processor 20 always inquires for other service processors whether they are in a normal state. If the service processor does not receive a normal response from the other service processor, the service processor recognizes a hang-up of the service processor.

If the service processor recognizes that the hung service processor is set to the level-one, the cluster 2 determines the physical number ID of the new service register based on the decision theory.

The new service processor 20, which is set to the level-one service processor, sets the physical number of its own service register into the SVP selecting register 10, and updates the old physical number ID. As a result, the level-one service processor is switched to a new service processor.

We claim:

1. An automatic method for switching a right of management/control for a shared-storage unit between a plurality of service processors in a cluster-coupled system where each cluster is connected to a shared-storage unit via a primary communication path and a service processor selecting register, each cluster of the cluster-coupled system being formed with one of the plurality of service processor, the method comprising the steps of:

registering a physical number of the service processor which acquires the right of management/control in the service processor selecting register; and providing a secondary communication path connecting each of the plurality of service processors;

wherein, when a service processor of a first cluster detects a power-off or a hang-up message from the service processor of the cluster which includes the service processor registered in the service processor selecting register through the secondary communication means, the service processor of the first cluster determines a new physical number of the service processor which acquires the right of management/control based on a predetermined decision theory, and registers the determined physical number in the service processor selecting register.

2. An automatic switching method as claimed in claim 1, wherein the cluster-coupled system is an SCMP (storage-coupled multiprocessor system.

3. An automatic switching method as claimed in claim 1, wherein the predetermined decision theory selects the service processor having the smallest physical number.

4. An automatic switching method as claimed in claim 1, wherein the secondary communication path is a local area network (LAN).

5. An automatic switching method as claimed in claim 1, wherein the service processor which acquires the right of management/control is defined as a level-one service processor.

6. A method of switching a right of management/control over a shared-storage unit between a plurality of clusters in a cluster-coupled system wherein the clusters are connected to the shared-storage unit by a main communication path, the method comprising:

registering a physical number of the cluster which currently has the right of management/control;

detecting whether the cluster which currently has the right of management/control has entered one of a power-off state and a hang-up state via a secondary communication path connecting each of the plurality of clusters;

selecting a new cluster to receive the right of management/control, the selecting being performed by the clusters; and registering a physical number of the new cluster.

7. A method of switching a right of management/control as claimed in claim 6, wherein the new cluster is selected based on its physical number.

8. A method of switching a right of management/control as claimed in claim 6, wherein the cluster which currently has the right of management/control sends a signal to each of the other clusters indicating it has entered one of a power-off state and a hang-up state.

* * * * *

UNITED STATES PATENT AND TRADEMARK OFFICE
CERTIFICATE OF CORRECTION

PATENT NO.   : 5,694,550
DATED        : Dec. 2, 1997
INVENTOR(S)  : TAKEDA et al.

It is certified that error appears in the above-identified patent and that said Letters Patent is hereby corrected as shown below:

TITLE PAGE: [73] Assignee: Change "Tokyo" to --Kawasaki--.

Col. 6,   line 3 (Claim 2, line 3), after "multiprocessor" insert --)--.

Signed and Sealed this

Fourth Day of August, 1998

Attest:

BRUCE LEHMAN

*Attesting Officer*        *Commissioner of Patents and Trademarks*